US012016811B2

(12) United States Patent
Hopkins et al.

(10) Patent No.: US 12,016,811 B2
(45) Date of Patent: Jun. 25, 2024

(54) MULTI-STABLE COMPLIANT-MECHANISM MATTRESS FOR BED SORE PREVENTION

(71) Applicants: THE REGENTS OF THE UNIVERSITY OF CALIFORNIA, Oakland, CA (US); Piyush Sheth, Porter Ranch, CA (US)

(72) Inventors: Jonathan Hopkins, Los Angeles, CA (US); Piyush Sheth, Porter Ranch, CA (US)

(73) Assignees: THE REGENTS OF THE UNIVERSITY OF CALIFORNIA, Oakland, CA (US); Piyush Sheth, Porter Ranch, CA (US)

( * ) Notice: Subject to any disclaimer, the term of this patent is extended or adjusted under 35 U.S.C. 154(b) by 152 days.

(21) Appl. No.: 17/585,271

(22) Filed: Jan. 26, 2022

(65) Prior Publication Data

US 2022/0175601 A1 Jun. 9, 2022

Related U.S. Application Data

(63) Continuation of application No. PCT/US2020/044561, filed on Jul. 31, 2020.

(Continued)

(51) Int. Cl.
*A61G 7/057* (2006.01)
*A47C 23/00* (2006.01)

(Continued)

(52) U.S. Cl.
CPC ............ *A61G 7/0573* (2013.01); *A47C 21/02* (2013.01); *A47C 21/022* (2013.01); *A47C 21/028* (2013.01);

(Continued)

(58) Field of Classification Search
CPC .. A61G 7/05715; A47C 23/002; A47C 23/02; A47C 23/32; A47C 23/30; A47C 23/18; A47C 23/12; A47C 23/125; A47C 23/00
See application file for complete search history.

(56) References Cited

U.S. PATENT DOCUMENTS 185,113 A * 12/1876 Lattin .................... A47C 23/02 267/86
1,893,170 A * 1/1933 Hilton ................ A47C 27/0456 5/252

(Continued)

FOREIGN PATENT DOCUMENTS

| | | |
|---|---|---|
| GB | 1009787 | 11/1965 |
| WO | 2021026013 | 2/2021 |

OTHER PUBLICATIONS

Petrone, Kim et al., "Pressure Ulcer Litigation: What is the Wound Center's Liability?" Todays Wound Clinic, vol. 11, Issue 9, Sep. 6, 2017, pp. 1-6.

(Continued)

*Primary Examiner* — Justin C Mikowski
*Assistant Examiner* — Morgan J McClure
(74) *Attorney, Agent, or Firm* — O'BANION & RITCHEY LLP; John P. O'Banion

(57) ABSTRACT

A pressure sore prevention mattress is provided alternating pressure points on the body of an occupant that is easily transformable between two stable configurations. The four-layer mattress construction has a top foam pad, a webbing layer, a dynamic layer of deformable panels trapezoid-shaped four-bar mechanisms that deform to produce an undulating pattern of peaks, and a base. Panel geometry can determine peak height. The mattress has a spatially hollow geometry that allows natural air convection through the breathable top foam pad to enable drying of moisture as well as the use of forced air convective drying or cooling. The (Continued)

mattress can be transformed from one configuration to the other while the occupant is on the mattress.

22 Claims, 6 Drawing Sheets

Related U.S. Application Data

(60) Provisional application No. 62/882,283, filed on Aug. 2, 2019.

(51) Int. Cl.
*A47C 23/02* (2006.01)
*A47C 23/12* (2006.01)
*A47C 21/02* (2006.01)

(52) U.S. Cl.
CPC ............ *A47C 23/00* (2013.01); *A47C 23/002* (2013.01); *A47C 23/02* (2013.01); *A47C 23/12* (2013.01)

(56) References Cited

U.S. PATENT DOCUMENTS

| | | | | |
|---|---|---|---|---|
| 2,119,706 | A * | 6/1938 | Drexler | A47C 27/0456 5/692 |
| 3,302,220 | A * | 2/1967 | Gauthier | A47C 23/02 5/721 |
| 3,720,966 | A * | 3/1973 | Zysman | A47C 7/20 297/DIG. 2 |
| 3,728,747 | A * | 4/1973 | Docker | A47C 27/00 5/692 |
| 4,432,109 | A * | 2/1984 | Huspeni | A47C 23/30 5/721 |
| 4,559,656 | A | 12/1985 | Foster | |
| 4,862,540 | A * | 9/1989 | Savenije | A47C 27/148 5/655.9 |
| 5,165,125 | A * | 11/1992 | Callaway | A47C 23/002 5/255 |
| 5,462,519 | A | 10/1995 | Carver | |
| 5,558,314 | A * | 9/1996 | Weinstein | A47C 27/20 5/255 |
| 5,785,303 | A * | 7/1998 | Kutschi | A47C 23/00 267/86 |
| 5,787,533 | A * | 8/1998 | Fromme | A47C 23/002 5/255 |
| 6,170,808 | B1 * | 1/2001 | Kutschi | A47C 27/146 5/247 |
| 6,425,153 | B1 * | 7/2002 | Reswick | A47C 7/024 297/452.53 |
| 6,668,409 | B1 | 12/2003 | Blumer | |
| 6,701,551 | B1 * | 3/2004 | Antinori | A47C 27/16 5/236.1 |
| 7,334,280 | B1 * | 2/2008 | Swartzburg | A47C 21/046 5/724 |
| 7,386,903 | B2 | 6/2008 | Hochschild | |
| 9,538,854 | B1 * | 1/2017 | Jackson | A47G 9/02 |
| 9,717,638 | B2 | 8/2017 | O'Reagan | |
| 10,104,983 | B1 * | 10/2018 | Robins | A47C 27/144 |
| 10,265,237 | B2 | 4/2019 | Devanaboyina | |
| 2001/0047551 | A1 * | 12/2001 | Collard | A47C 27/001 5/716 |
| 2002/0078509 | A1 * | 6/2002 | Williams | A47C 23/005 5/722 |
| 2004/0195743 | A1 * | 10/2004 | Pfau | A47C 23/00 267/142 |
| 2005/0116526 | A1 * | 6/2005 | VanDeRiet | A47C 23/05 297/452.51 |
| 2007/0262634 | A1 * | 11/2007 | Brill | A47C 23/002 297/452.15 |
| 2008/0078026 | A1 * | 4/2008 | Thomas | A47C 23/18 5/118 |
| 2009/0056016 | A1 * | 3/2009 | Zack | E04F 15/22 5/417 |
| 2012/0200018 | A1 * | 8/2012 | Paz | A47C 7/027 267/166.1 |
| 2013/0174350 | A1 * | 7/2013 | Allman | A47C 27/144 156/60 |
| 2013/0239323 | A1 * | 9/2013 | Schulz, Jr. | A47C 23/02 5/247 |
| 2015/0216317 | A1 * | 8/2015 | DeFranks | A47C 23/02 5/719 |
| 2016/0029810 | A1 * | 2/2016 | Malkiewicz | A47C 27/142 5/724 |
| 2016/0120330 | A1 * | 5/2016 | DeFranks | A47C 7/025 5/655.7 |
| 2016/0316927 | A1 * | 11/2016 | Thomas | A47C 27/064 |
| 2017/0347808 | A1 * | 12/2017 | Fromme-Ruthmann | A47C 23/002 |
| 2021/0022518 | A1 * | 1/2021 | Chapin | A47C 27/15 |
| 2023/0200553 | A1 * | 6/2023 | Leng | A47C 27/053 5/720 |

OTHER PUBLICATIONS

Article by Agency for HealthCare Research and Quality 2018, "Preventing Pressure Ulcers in Hospitals", Oct. 7, 2018, 9 pages, https://www.ahrq.gov/professionals/systems/hospital/pressureulcertoolkit/putool1.html.

Hegg, Jessica, "6 Best Mattresses to Prevent Bed Sores", 2018 Review, Vive Health, Feb. 1, 2018, pp. 1-11, https://www.vivehealth.com/blogs/resources/best-mattress-to-prevent-bed-sores 2018.

Hopkins, J.B., "Chapter 6: Synthesis Through Freedom and Constraint Topologies," in Handbook of Compliant Mechanisms, Edited by Howell, L.L., Magleby, S.P., Olsen, B.M., John Wiley and Sons Ltd, Oxford, UK, 2013, pp. 1-11.

Hatamizadeh, Ali, et al., "Optimizing the Geometry of Flexure System Topologies Using the Boundary Learning Optimization Tool (BLOT)," Mathematical Problems in Engineering, vol. 2018, Article ID 1058732, 2018, 14 pages, https://doi.org/10.1155/2018/1058732.

ISA/US, United States Patent and Trademark Office (USPTO), International Search Report and Written Opinion dated Oct. 21, 2020, related PCT international application No. PCT/US2020/044561, pp. 1-8, with claims searched, 9-13.

European Patent Office (EPO) Extended Supplemental Search Report (ESSR) dated Aug. 31, 2023, for related European Patent Application No. 20849931.9, pp. 1-7, with claims examined, pp. 8-10.

* cited by examiner

MULTI-STABLE COMPLIANT-MECHANISM MATTRESS FOR BED SORE PREVENTION

CROSS-REFERENCE TO RELATED APPLICATIONS

This application claims priority to, and is a 35 U.S.C. § 111(a) continuation of, PCT international application number PCT/US2020/044561 filed on July 31, 2020, incorporated herein by reference in its entirety, which claims priority to, and the benefit of, U.S. provisional patent application Ser. No. 62/882,283 filed on Aug. 2, 2019, incorporated herein by reference in its entirety. Priority is claimed to each of the foregoing applications.

The above-referenced PCT international application was published as PCT International Publication No. WO 2021/026013 A1 on Feb. 11, 2021, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to bed mattresses and medical nursing equipment for people and more particularly to pressure alleviating mattresses for bed sore prevention.

2. Background

A significant concern of medical care providers with patients who are bedridden for long periods of time is the probable occurrence of bedsores or skin ulcers in areas of the body that are in constant contact with the mattress. Bed sores are caused primarily by the occurrence of increased and constant pressure on the capillaries in the dermis of the skin that results in the prolonged blockage of blood flow. Contact pressures exceeding 32 mm of Hg for longer than two hours can cause pressure sores.

Bed sores are a complex problem that are influenced by the age, nutrition, hygiene, medical conditions, moisture and prolonged higher pressure on the contact points of the patient on the surfaces of the mattress of a bed. Pressure sores typically occur in the bony prominences on the back and hips of patient when they are laying on the bed. Primary areas of the body that are candidates for bedsore development include the occipital region, scapula, sacrum. ischium, ankles and heels.

Immobile, high-risk patients may often develop bed sores within 4 to 6 hours if they are not properly and regularly repositioned. The current hospital protocol is to turn the patient every two hours. However, this repositioning requirement not only disturbs and awakens sleeping patients, it may also cause maceration due to the shear forces experienced by the often fragile and sensitive skin of the patient. Repositioning can also be a liability for the nurses who have to turn the patient, who may be overweight and difficult to move.

Different systems have been developed to prevent bed sores from occurring such as the application of pressure on different areas of the body over time to stimulate blood movement or maintain blood flow. As an alternative to turning the patient every two hours, the most effective bed sore prevention approach to date is the use of silica-bead air fluidized beds that reduce the pressure points on the patient's body. Although effective, air fluidized beds are costly and such costs may not be reimbursed by insurance or government benefits until the patient experiences stage IV bed-sores, which is practically the point of no return. Even private buyers who can afford the high price of an air fluidized bed may have difficulty accommodating a fluidized bed in their home as they are extremely heavy (>0.5 ton) and difficult to transport and install.

Alternating air pressure cell mattresses are intended to have similar bed sore prevention outcomes and are less costly. However, use of air pressure mattresses is not currently backed by sufficient evidence of efficacy and durability to deserve a strong recommendation. They often require noisy pumps that constantly consume power and possess numerous valves that are complex and sometimes fragile and often leak after multiple uses.

Unfortunately, approximately 2.5 million patients are affected with bed sores every year in the United States. About sixty thousand (60,000) patients die every year as a direct result of the presence of bed sores. As a consequence, bed sores produce $9.1 to $11,6 billion in treatment costs every year in the U.S. alone. Individual patient care cost is ranging from about $20,900 to $151,700. The Centers for Medicare and Medicaid Services estimated that in 2007 each pressure sore added $43,180 in costs to a hospital stay. Pressure ulcers in managed care or hospitalized patients are one of the most litigated conditions in civil lawsuits alleging medical malpractice. The average settlement of a pressure ulcer lawsuit is in the range of $250,000 with some awards topping $312 million with 87% cases favoring the plaintiffs.

Accordingly, there is a need for mattress systems that are effective at limiting the occurrence of pressure ulcers, that are durable and that are relatively inexpensive to own and maintain.

BRIEF SUMMARY

A bi-stable compliant-mechanism mattress is provided that alternates pressure points on the body of an occupant to effectively prevent bed sores. In one embodiment, the mattress passively conforms to the body of the patient in each of its two stable configurations without the need for drawing power or repositioning the patient. The mattress provides alternating pressure points as desired depending on which of the two stable configurations of the mattress is selected.

The energy needed to reconfigure the mattress from one stable configuration to the other should be minimal since a substantial amount of strain energy is stored in the deformed resilient mechanism, which would help counteract the weight of the body of the patient. In one embodiment, the mattress can be manually actuated by pulling it from one side to the next with as little effort as it would take to open and close a drawer. Alternatively, a single small motor could be automated to shift the mattress from one stable configuration to the next every two hours using minimal power. Note also that the occupant of the bed moves with the mattress as it is reconfigured from one stable configuration to the next so that the skin of the occupant does not experience harmful shearing forces as the pressure points alternate.

The mattress will optimally alternate pressure points silently without drawing power to prevent bedsores in patients that weigh up to 600 pounds so that nurses or other caregivers will not have to physically turn the patient. The mattresses will only produce a quiet clicking noise when shifted from one state to the next in contrast to the loud squeaking noises and wear caused by friction generated within the sliding joints of traditional rigid mechanisms that often require lubricants.

These mattresses also allow air to passively flow through the geometry of the mattress to prevent the occupant from perspiring. The topology of the layers with spatially hollow geometry allows natural air convection through the breathable top foam layer to enable drying of any moisture. This geometry also allows the use of forced air from a source for convective drying or air flow cooling or heating as desired.

In one embodiment, the mattresses are designed with horizontal panels that can be adjusted along their length so that the patient's feet and torso can be lowered while their knees and head are lifted like that of traditional hospital beds without modification to the mattress design.

According to one aspect of the technology, a dynamic, compliant mechanism based mattress design is provided that can reduce the occurrence of bed sores in the existing immobile and aging population and improve the lives of many patients every year.

According to another aspect of the technology, a low power, functional mattress design is provided that is substantially lower in cost compared to the cost of silica-bead air fluidized beds.

Another aspect of the technology is to provide a pressure sore limiting mattress design that is affordable while also being robust, lightweight, and transportable.

Another aspect of the technology is to provide a mattress with dynamically produced points of contact that can be readily changed while the bed is occupied eliminating the need for regular position interventions.

A further aspect of the technology is to provide a mattress with undulations with a height that is controllable by the geometry of the elements of the deformable panels.

Another aspect is to provide a compliant-mechanism platform that can be adapted for use as wheelchair cushions and also improve the comfort of airline, car, or truck passengers that have to sit in seats for extended periods of time.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, devices, systems and methods for decreasing pressure points and pressure sores in immobile and aging patients are generally shown. Several embodiments of the technology are described generally in FIG. 1 to FIG. 10 to illustrate the characteristics and functionality of the devices, systems, materials and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
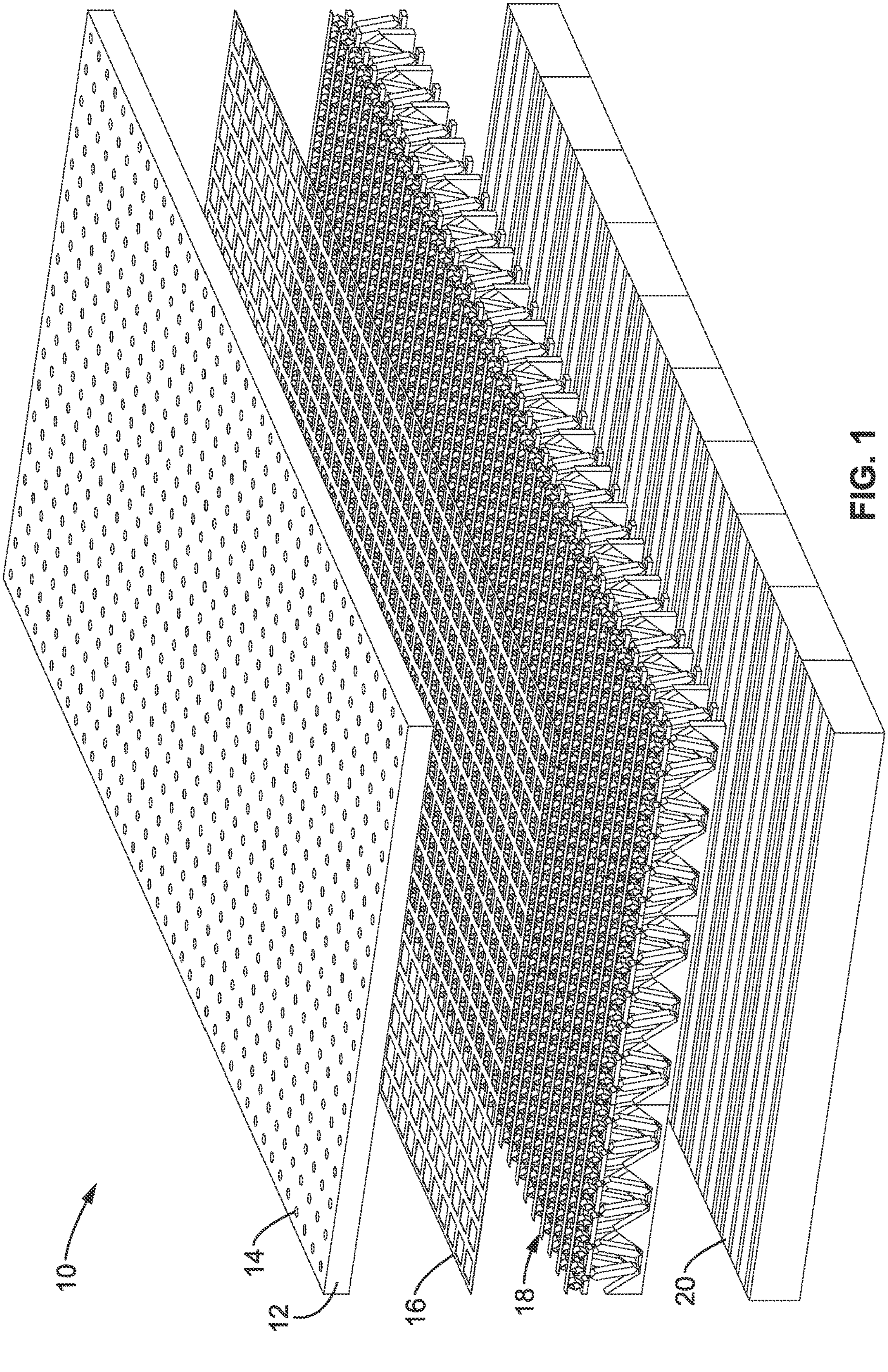
FIG. 1 is a diagram of an expanded view of a mattress structure with four layers according to one embodiment of the technology.

Turning now to FIG. 1, an embodiment of affordable, lightweight mattress that utilizes multi-stable compliant mechanisms is used to generally illustrate the bed or cushioning platform. The bi-stable compliant-mechanism-based mattress 10 is a platform that periodically shifts pressure points on the body of the occupant of the bed or cushion to avoid pressure related sores. The shifting of pressure points by the mattress platform also reduces the need for turning hospital patients every two hours and the associated secondary injuries to patients and staff that can occur with the frequent repositioning of heavy patients.

In the expanded embodiment of FIG. 1, the compliant-mechanism-based mattress 10 comprises four layers. The top layer is a rectangular foam pad 12 with periodic holes 14 punched through the pad 12. The purpose of the top pad 12 is to provide a comfortable interface surface for the occupant. The holes 14 of pad 12 are there to help circulate air from underneath the mattress to passively prevent bed sores by helping to prevent the formation of sweat and to provide openings for the movement of air to and away from the surface of the reclining body of the occupant. Although the pad 12 preferably has holes, the pad may be solid in one embodiment. The foam pad 12 can be made of conventional foam rubber, memory foam or similar material.

Below the bottom surface of top pad 12 is an open grid of straps 16 that allows air to pass through its geometry into the holes 14 of the foam pad 12 of the mattress 10. The straps of the grid 16 are preferably oriented orthogonally to form a grid with openings to allow the flow of air through holes 14 of pad 12. In one embodiment, the intersections of the vertical and horizontal straps may be joined together. In another embodiment, the vertical and horizontal straps simply overlap.

The straps of grid 16 also provide lateral support for the elongate horizontal compliant panels below them in the dynamic mechanism layer 18. In one embodiment, corresponding straps of grid 16 are oriented and mounted to the top surface of each of the parallel horizontal compliant panels forming the dynamic mechanism layer 18 of the mattress 10.

Figure 2:
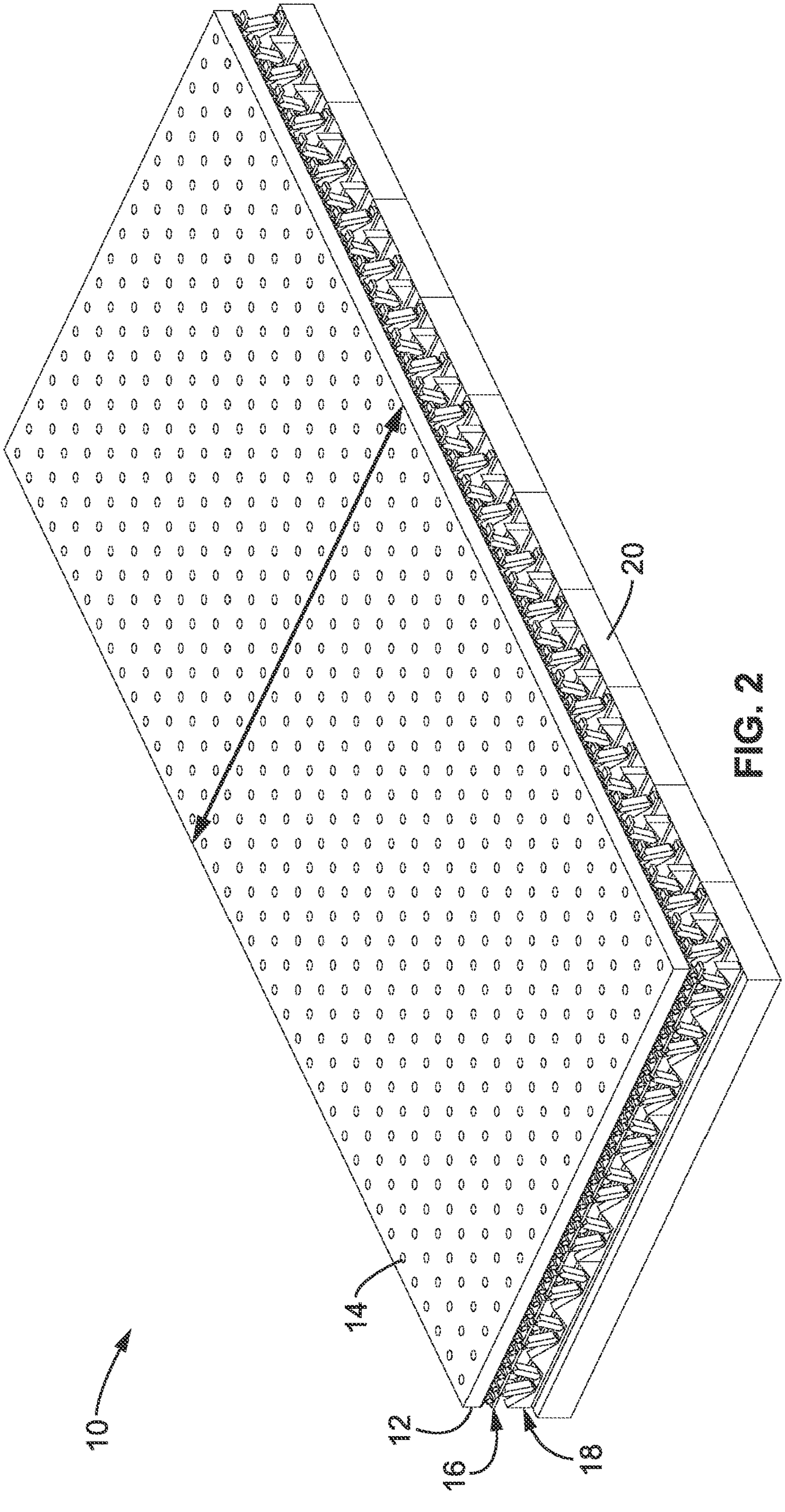
FIG. 2 is a diagram of an assembled mattress of the four layers shown in FIG. 1 with an arrow that indicates the direction of actuation.

The individual panels forming the dynamic mechanism layer 18 are mounted to a foundation layer 20 that supports the whole mattress. The foundation layer 20 may segmented or sectioned across the width as shown in FIG. 1 and FIG. 2 or the foundation 20 may be a solid sheet. The horizontal segments forming of foundation 20, may be held together with straps or flexible hinges so that the foundation layer 20 is flexible lengthwise but inflexible widthwise. In one embodiment, the foundation layer is made from a flexible material that is resilient and can stretch and flex.

The four layers affixed together forming the mattress 10 are shown in FIG. 2. The arrow that is depicted on the top surface of the top pad 12 indicates the side to side direction of actuation of the panels of the dynamic mechanism layer 18.

As shown in detail in FIG. 3 through FIG. 10, the dynamic layer 18 of the mattress is formed with an array of parallel horizontal compliant panels that can move between two stable states. Each panel is preferably planar and mounted on a base edge to the foundation layer 20. In one preferred embodiment, the panels are produced from an elongate piece that is cut from a single flat slab using a planar fabrication processes such as waterjet, wire EDM, CNC milling process, etc. Since the panels are two-dimensional extrusions in this embodiment, the design can be fabricated rapidly with conventional planar processes and using minimal steps allowing high-throughput and low-cost manufacturing. The design is also easily customizable for individual patients without increasing the cost of making each mattress.

Figure 3:
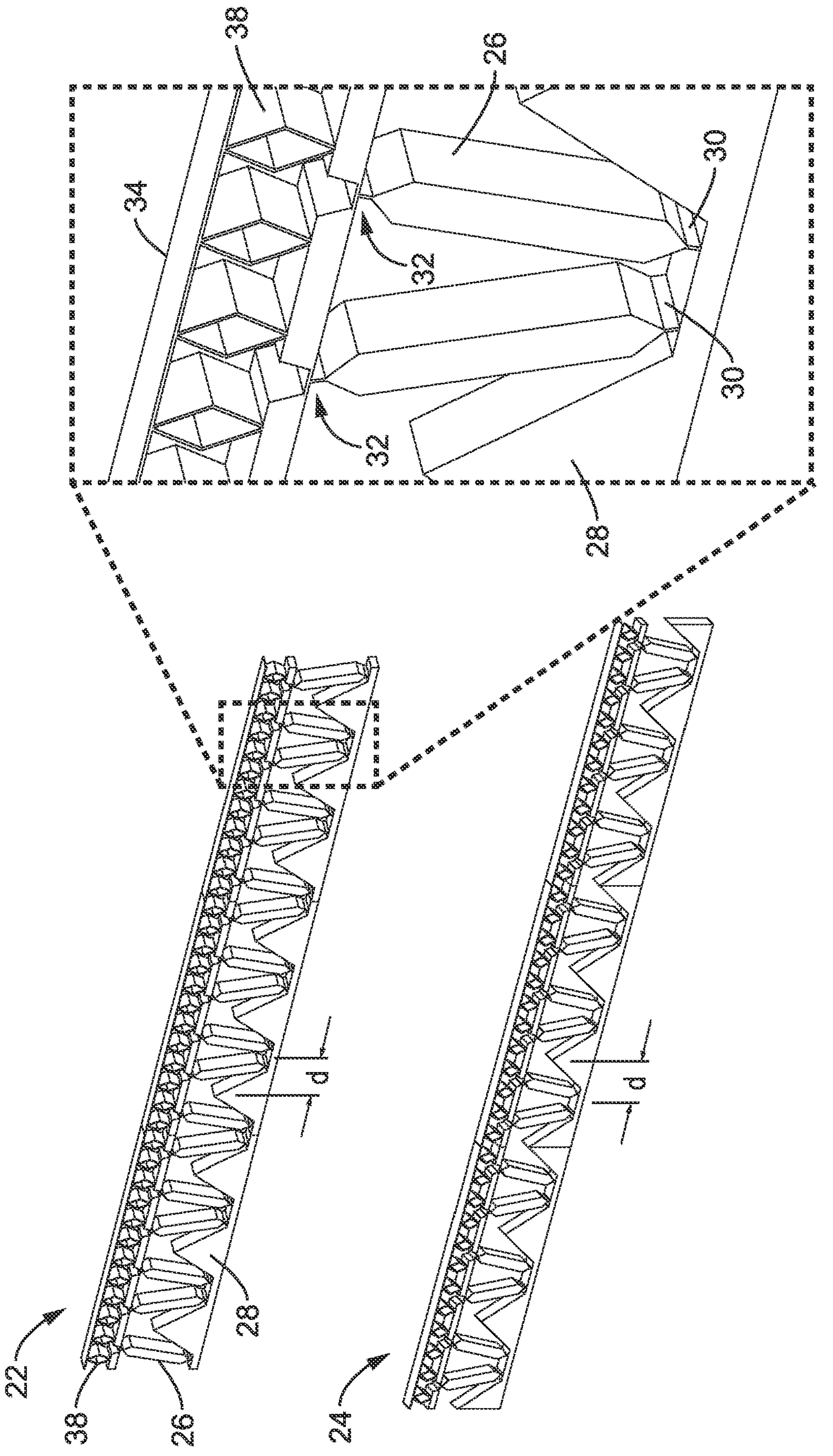
FIG. 3 is a diagram of two different panels that are arranged sequentially, in parallel and out of phase.

There are two panels 22, 24 illustrated in FIG. 3. These panels are essentially identical to each other, but in different phases and are configured to be mounted parallel to each other so that one panel is offset out of phase from the other by a distance, d. The parallel horizontal panels that form the dynamic layer 18 are preferably separated from each other with a spacing of the same distance, d, in one embodiment. It is also preferred that each of the panel types are sequentially alternated from one phase to the other along the entire length of the dynamic layer 18 of the mattress 10.

The individual panels 22 have a base with triangle shaped stops 28 along its length with two rigid legs 26 spaced and mounted between the triangles with thin compliant and resilient hinges or joints 30 as seen in the detail of FIG. 3. The hinges 30 allow the legs 26 to pivot back and forth in the direction of either adjacent triangular stops 28 within the plane of the panel.

The top end of each of the legs 26 is mounted to an upper layer 34 with thin compliant hinges or joints 32. The top hinges 30 and the bottom hinges 32 of the legs 26 are also resilient in one embodiment so that the legs 26 return to a starting position.

The upper layer 34 of the panel is preferably formed from top 42 and bottom 44 flexible strips separated by a layer of deformable diamond elements 38. The base of the panel with triangular shaped stops is mounted to the foundation 20 layer with bolts, glue or other type of fastener. The top strip of the upper layer 34 with the deformable diamonds 38 of each panel 22, 24 is mounted to the strips of the grid layer 16.

Figure 4A:
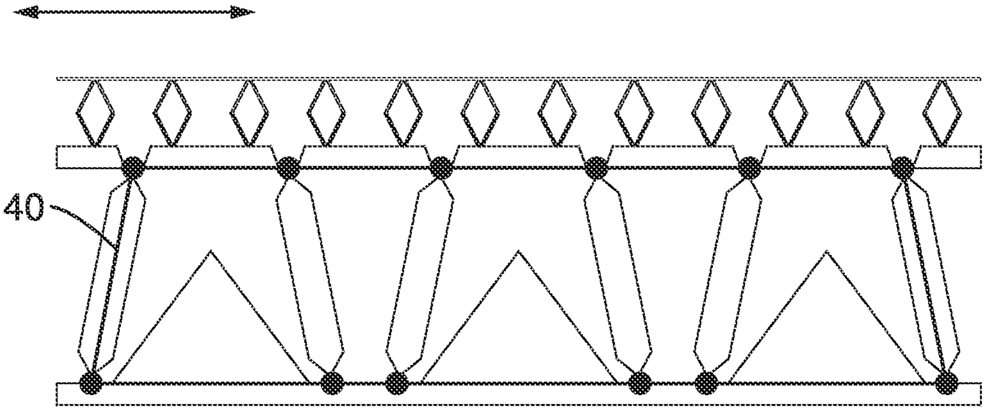
FIG. 4A is a schematic side view of a panel section showing the trapezoid-shaped four-bars within each panel design shown with diamond flexures on top and in an unloaded state. The direction of actuation is also shown.
Figure 4B:
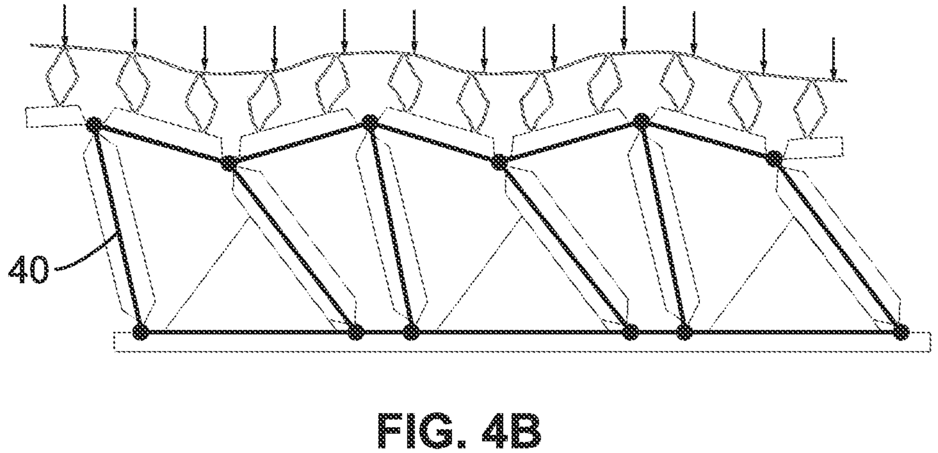
FIG. 4B is a schematic side view of a panel section in a loaded state from above showing the four-bar mechanism deforms into one of its two stable configurations when it is loaded from above thus producing undulating pressure points.

As seen in the side views of FIG. 4A and FIG. 4B each of the panels are designed to be a series of trapezoid-shaped four-bar mechanisms. The bars forming the mechanism shape are highlighted by solid lines 40 shown in FIG. 4A and FIG. 4B. The rigid bodies that constitute each "bar" that are joined together by thin compliant hinges or joints 30, 32. These joints deform when the mattress is loaded thus producing the undulating pattern shown in FIG. 4B. The possible horizontal direction of movements of the top surface of the panel with respect to the base section as a result of the movement of the legs 26 and hinges 30, 32 is shown in FIG. 4A.

The layer with diamond shaped flexures 38 of the upper layer 34, shown in FIG. 4B on top of the trapezoid-shaped four-bar mechanisms, help to smooth out the undulating pattern so that it is more sinusoidal and gradual than the sharp triangles that the four-bars would alone produce. These undulations not only occur along the length of each panel but also occur in two-dimensions along the length of the bed when the bed is loaded as shown with vertical arrows in FIG. 4B. This two-dimensional undulation produced by the panels is enabled because of the two alternating offset series of panels as described and shown in FIG. 3.

The sections of the panels that are shown in FIG. 3 through FIG. 10 are uniform in size and geometry to illustrate the function of the panels of the dynamic layer 18. However, the geometry of the panels and the organization of the panel types in the dynamic layer 18 can be selected to control the height and location of undulations and pattern of pressure points in each configuration. As seen in FIG. 4B, for example, the deformations of the top level 34 of the panel form sinusoidal undulations with a height or peak and wavelength that is determined by the geometry of the leg and triangular stop elements and spacing of elements in each panel. In one embodiment, the pitch (wavelength of the sine wave i.e., the distance between two peaks) can vary within the panel. Consequently, it is possible to design the dynamic layer 18 and panels with a smaller pitch in the middle of the bed in the more sensitive areas like the sacrum (upper hip, buttocks), scapula (the bones in the back under either shoulder), head and the ankles. Smaller pitch will enable finer alternation of pressure points and will eliminate dead zones (areas where there is no change in pressure) and reduce the unnecessary cost of creating planar features with small pitch in the entire bed.

Figure 5:
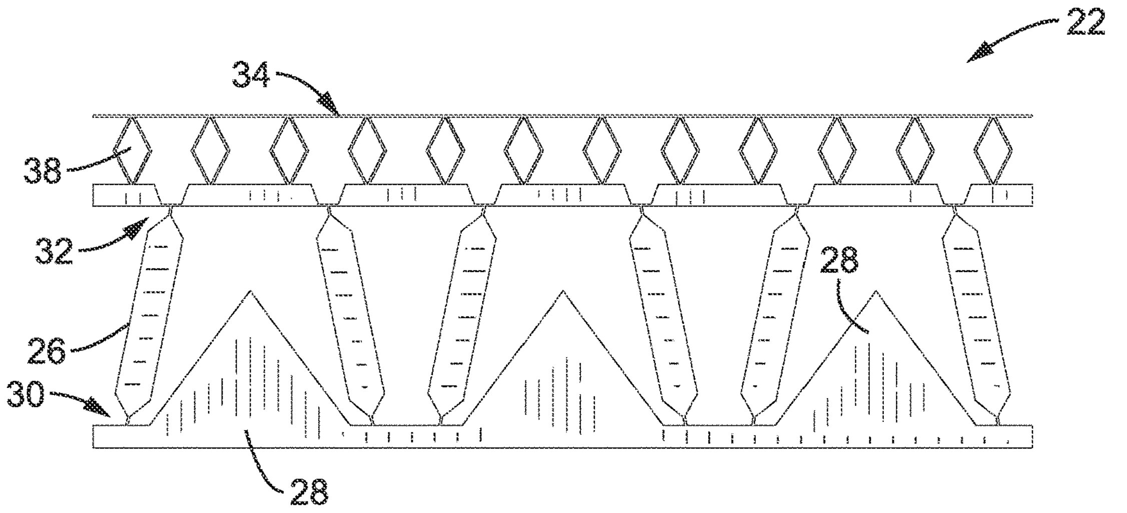
FIG. 5 is a side view of a panel section with a top layer with diamond shaped flexures in an unloaded state.
Figure 6:
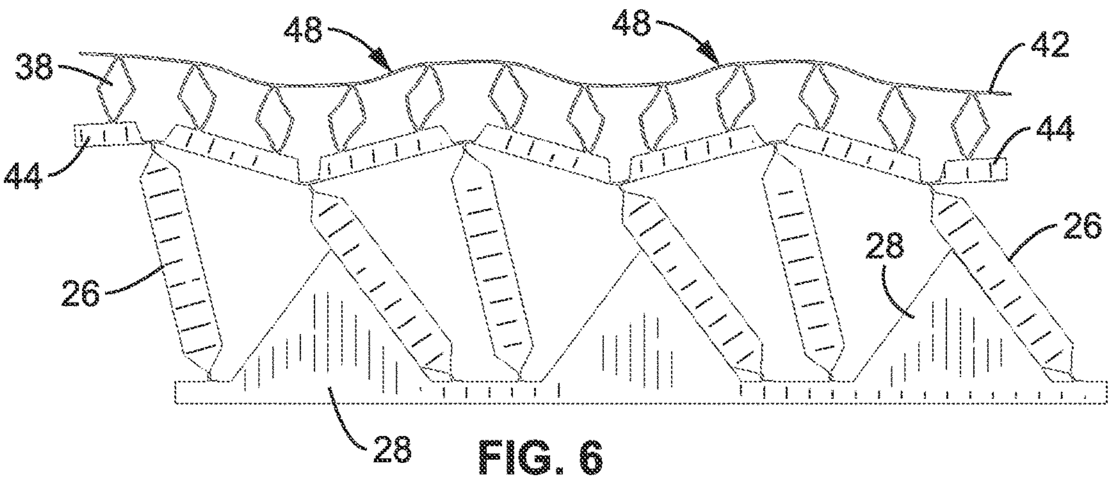
FIG. 6 is a side view of a panel section with a top layer with diamond shaped flexures of FIG. 5 in a loaded state and in a first configuration.
Figure 7:
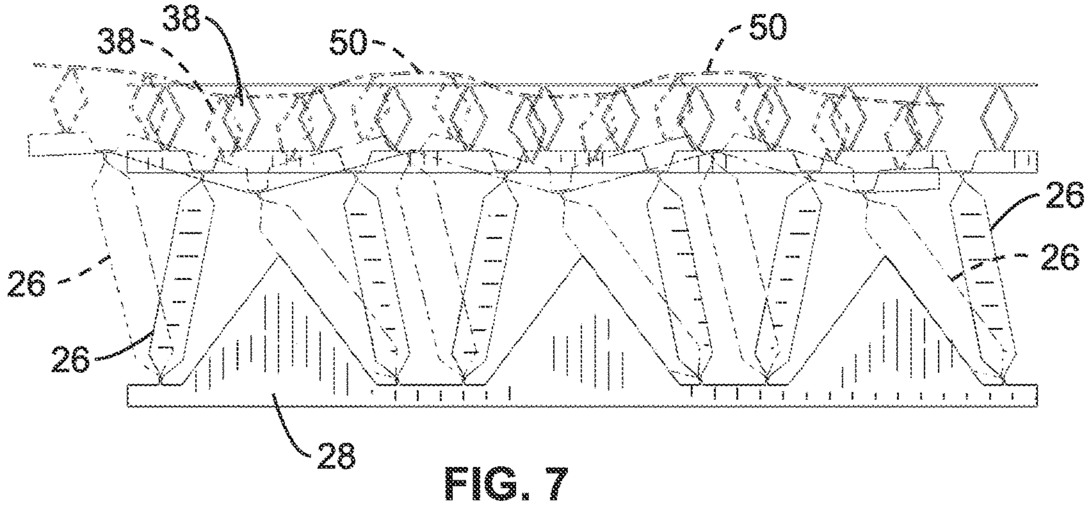
FIG. 7 is a side view of a panel section with a top layer with diamond shaped flexures of FIG. 6 in a loaded state transitioning to a second configuration.
Figure 8:
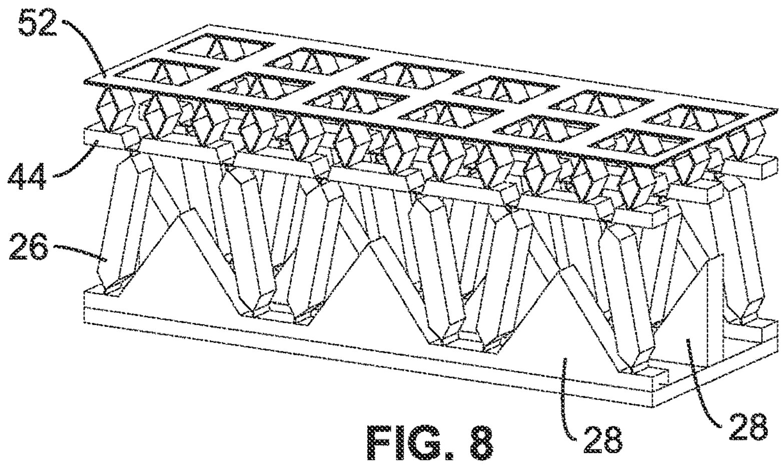
FIG. 8 is a perspective view of a sections of panels with alternating panels out of phase coupled to a grid of straps in an unloaded state or an intermediate transition state between configurations.
Figure 9:
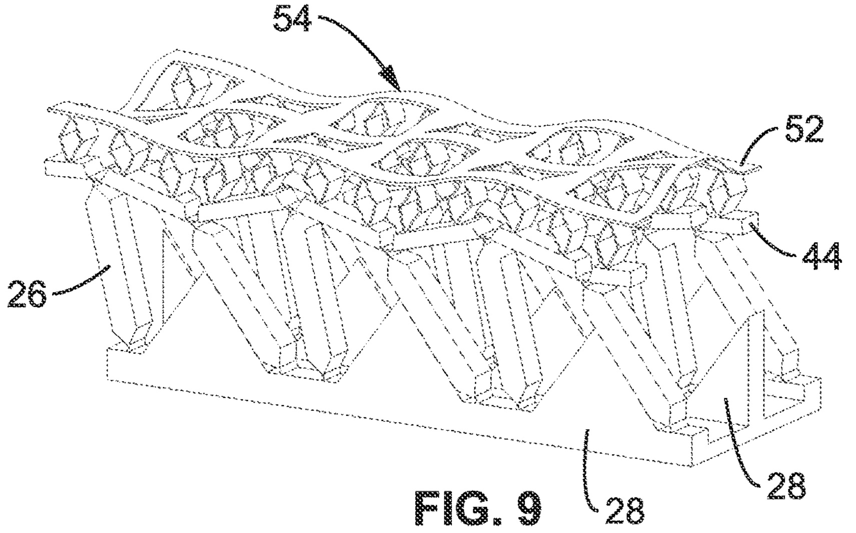
FIG. 9 is a perspective view of the sections of FIG. 8 in a loaded state and in a first configuration producing a first set of pressure points in the mattress.
Figure 10:
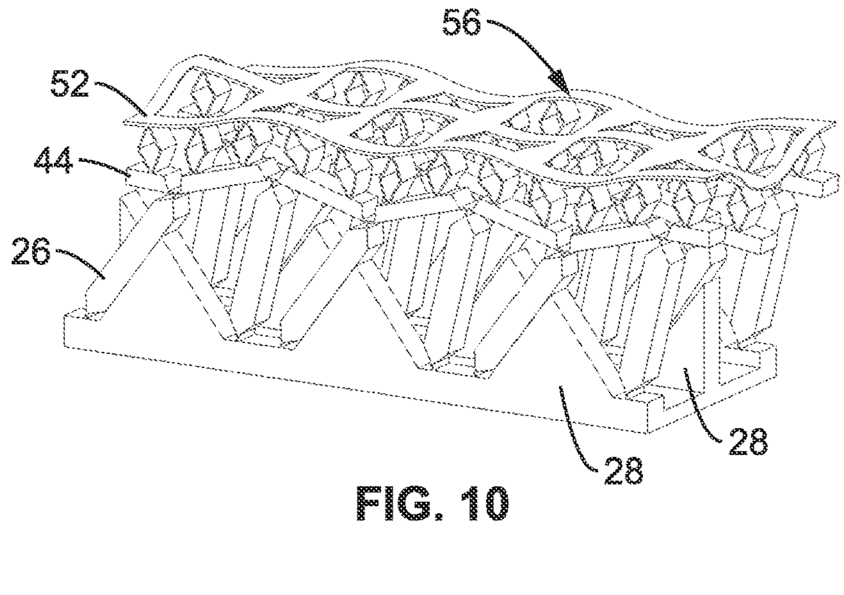
FIG. 10 is a perspective view of the sections of FIG. 9 in a loaded state moved to a second stable configuration producing a second set of pressure points in the mattress.

The movement of the elements of the panels and the mechanism of deformation into one of its two stable configurations when it is loaded from above producing undulating pressure points on the patient's body are shown in the side views of FIG. 5, FIG. 6 and FIG. 7 and the perspective views of FIG. 8, FIG. 9 and FIG. 10.

Referring now to FIG. 5, the resting state of the panels of the dynamic layer 18 is depicted in a side view. In this unloaded state, the legs 26 are not in contact with the triangular stop elements 28 of the base section of the panel 22 and the top layer 34 with diamond shaped flexures 38 is approximately horizontal. This configuration in FIG. 5 also illustrates a transition state between the two stable positions shown in FIG. 9 and FIG. 10, for example.

With the application of a load, as shown in FIG. 4B and FIG. 6, the legs 26 move about hinge 30 to engage the triangular stop 28 causing the deformation of the lower strip section 44, the flexure of diamond flexures 38 and the deformation top surface strip 42 of top layer 34. The pair of legs 26 are positioned so that one leg 26 can move about the axis of the bottom hinge 30 and engage an adjacent triangular stop 28 while the second leg of the pair of legs moves in the same direction as the first leg about the axis of its lower hinge 30 but does not engage a triangular stop 28. The geometry of the deformations can also be changed with the angle of the triangular stop elements 28 or the selection of the distances between the hinges 30 and the triangular stops 28.

These deformations result in the creation of a stable undulation 48 in the panels and a pressure point on the load. These undulations 48 transfer through the foam pad 12 onto the back of the occupant to produce a grid or pattern of stable pressure points configured by the panel deformations.

The parallel panels 22 can also be moved to a second stable position by moving legs 26 of the panel from engaging one triangular stop 28 to engage an adjacent triangular stop 28 as illustrated in FIG. 7 and FIG. 10. When the panel is moved in one actuation direction, the left leg 26 will engage a triangular stop 28 and when the panel is moved in the opposite direction the right leg 26 will engage a second triangular stop 28.

The reconfiguration to the second stable position as shown in FIG. 7 will produce a second grid of undulations 50. Since the lattice of horizontal compliant panels can be reconfigured to two different stable positions, the bed can be actuated back and forth along the actuation direction, shown in FIG. 2, and the grid of pressure points can be alternated on any desired timetable. By pushing or pulling on the mattress along its actuation direction, the mattress can be reconfigured in either of these two configurations with minimal actuation power so the pressure points on the body of the occupant changes and the occupant is protected from accruing bed sores.

These undulations not only occur along the length of each panel but also occur in two-dimensions along the length of the bed when the bed is loaded as shown in FIG. 8, FIG. 9 and FIG. 10. This two-dimensional undulation is enabled because of the two alternating panel designs shown in FIG. 3. These undulations transfer through the foam pad onto the back of the reclining occupant to produce a grid of pressure points that is dynamic.

Referring now to FIG. 8, a section of the dynamic mechanism layer 18 with three panels out of phase with the adjacent panel is shown with the grid 16 of straps 52 mounted to the top surface of the parallel panels. The section depicted in FIG. 8 is shown in an unloaded state as also illustrated in the cross-sections FIG. 4A and FIG. 5. In this embodiment, the joints 30, 32 and the flexible diamonds are compliant and resilient and bring the mattress to an even planar state. In another embodiment, the hinges 30, 32 at each end of the legs 26 are flexible but not resilient.

It can also be seen that there is a lot of open space between the panels for air to pass through the straps and the holes in the foam mattress to passively flow air to and from the body of the occupant from below.

The application of a load on the mattress will cause the formation of undulations 54 from deformations in the top layer of the panels with the pivoting movements of the legs 26 as illustrated in FIG. 9. The triangle-shaped rigid bodies in the center of each trapezoid in the panels illustrated in FIG. 4B, act as hard-stops so the four bars stop deforming when their legs 26 hit the triangular stops 28 and the bed remains in a stable configuration. The trapezoid-shaped four-bar mechanisms help to smooth out the undulating pattern so that it is more sinusoidal and gradual than the sharp triangles that the four-bars would produce alone.

As shown in FIG. 10 the pattern of undulations on the mattress can be changed with the actuation of panels from the first position illustrated in FIG. 9 to a second position shown in FIG. 10 producing new undulations 56. As also shown in FIG. 6 and FIG, 7, the legs 26 pivot around hinge 30 in the opposite direction so that an adjacent leg 26 engages an adjacent triangular stop 28 causing a different deformation of the top panel surface and a new undulation or pressure point 56 and overall producing a new pattern of pressure points by the mattress.

A particularly attractive feature of the design is that when the patient lays on the bed, the mattress passively deforms to one of the two configurations shown in FIG. 9 or FIG. 10. Since the compliant hinges 30, 32 labeled in FIG. 5 remain deformed in that configuration, that strain energy is reclaimed when the caregiver pulls the bed along the actuation direction shown in FIG. 2 and FIG. 4A. Once the caregiver pulls the mattress past that configuration, the mattress will again passively click into its second stable configuration. So, because the panels are compliant and resilient, they substantially reduce the force required to lift the patient and change the bed between its two stable positions as illustrated in FIG. 9 and FIG. 10. Thus, caregivers won't strain their muscles reconfiguring the bed. If the bed is actuated back and forth every hour or so, the pressure points are guaranteed to change at all points on the body of the occupant so that the occupant never develops bed sores.

One important feature of the mattress is that the patient can move with the mattress during transition between stable states. As a consequence, there is no relative motion and friction between the occupant and the mattress. There is also no pulling or pushing of any portion of the body of the occupant required eliminating any shear forces on the skin during transition.

Although manual actuation of the dynamic panel elements from a first configuration to a second configuration is illustrated, it will be understood that the configuration changes could be accomplished mechanically. For example, electric motors or solenoids could be used to perform the conformational changes. In one embodiment, a single linear motor could be automated to reconfigure the mattress to each of its two stable positions every hour or other designated time points. The motor would use minimal power since most of the energy necessary to lift the patient from one configuration to the next is passively stored as strain energy in the deformed compliant joints 30, 32 of the legs 26 (FIG. 3). The motor function and timing are programmed with a computer processor and programming providing automated control over configuration changes so that the occupant will be exposed to a new pattern of undulations and a different set of pressure points at controllable intervals.

The mattress 10 embodiment shown in FIG. 1 has a segmented foundation 20 that can flex or bend along the length. The panels are mounted to the foundation 20 in the same direction as horizontal segments of the foundation 20 allowing the foundation 20 to bend. The segments forming the foundation may be flexibly coupled or hinged to move in relation to each other in one direction. In this embodiment, the mattress design with horizontal segments and panels can be adjusted along their length so that the patient's feet and torso can be lowered while their knees and head are lifted like traditional hospital beds without modification to the mattress design. Accordingly, the mattress can be bent at locations along the length of the patient's body to allow the patient to sit up in bed and lay down flat like other hospital bed mattresses in use and still allow patient to be exposed to a changing pattern of undulations and set of pressure points.

From the description herein, it will be appreciated that the present disclosure encompasses multiple embodiments which include, but are not limited to, the following:

1. A mattress apparatus for minimizing pressure ulcers, the apparatus comprising: (a) a foam pad with a top surface and a bottom surface; (b) a webbing layer mounted to the bottom surface of the foam pad; (c) a dynamic layer of a plurality of planar panels with a deformable strip coupled to the webbing layer, a base and two or more legs coupled to the deformable strip and base with resilient hinges; and (d) a foundation layer coupled to the base of the panels; (e) wherein the legs and deformable strip of the dynamic layer can move between two stable positions; and (f) wherein movement of the legs and deformable strip in relation to the base of each panel causes deformations in the deformable strip.
2. The apparatus of any preceding or following embodiment, wherein the foam pad comprises a foam pad with periodically positioned holes through the pad, the holes configured for air circulation through the foam pad.
3. The apparatus of any preceding or following embodiment, wherein the foam pad is made of a material selected from the group of materials consisting of memory foam and foam rubber.
4. The apparatus of any preceding or following embodiment, wherein the webbing layer comprises a grid of orthogonal straps, at least one of the straps configured for coupling with a deformable strip of each panel.
5. The apparatus of any preceding or following embodiment: wherein the plurality of panels comprises a plurality of first panels and a plurality of second panels; wherein the first panels configured with an offset that is out of phase from the second panels; and wherein the plurality of panels is configured such that the first and second panels are positioned in a sequentially alternating pattern.
6. The apparatus of any preceding or following embodiment, wherein the deformable strip of the planar panels comprises: a top panel layer; a resilient lower panel layer; and a plurality of diamond-shaped flexures disposed between the top panel layer and the lower panel layer.
7. The apparatus of any preceding or following embodiment, wherein the base of the planar panels further comprises: a linear outer edge configured for mounting to the foundation layer; an inner edge with triangular shaped rigid bodies spaced regularly along the inner edge of the base member; and pairs of legs flexibly coupled at one end to the inner edge of the base member between the triangular shaped rigid bodies with resilient hinges; wherein movement of the legs is limited by the triangular shaped rigid bodies.
8. The apparatus of any preceding or following embodiment, wherein the foundation layer is flexible.
9. The apparatus of any preceding or following embodiment, wherein the foundation layer comprises a plurality of rigid horizontal segments.
10. A mattress apparatus, comprising: (a) a support substrate; (b) a plurality of planar panels having an upper member coupled to a base member with a plurality of legs and flexible hinges, the base member mounted to the support substrate, the panels oriented parallel to each other; (c) a grid of straps joined to the upper member of the panels; and (d) a top layer coupled to the grid of straps; (e) wherein each upper member of the panels moves in relation to the base member from a first stable position to a second stable position.
11. The apparatus of any preceding or following embodiment, wherein the support substrate is flexible.
12. The apparatus of any preceding or following embodiment, wherein the support substrate comprises a plurality of rigid horizontal segments flexibly coupled to each other.
13. The apparatus of any preceding or following embodiment, wherein the upper member of the planar panels comprises: a top panel layer; a resilient lower panel layer; and a plurality of diamond-shaped flexures disposed between the top panel layer and the lower panel layer.
14. The apparatus of any preceding or following embodiment, wherein the base member of the planar panels further comprises: a linear outer edge configured for mounting to the support substrate; and an inner edge with triangular shaped rigid bodies spaced regularly along the inner edge of the base member; and pairs of legs flexibly coupled at one end to the inner edge of the base member between the triangular shaped rigid bodies with resilient hinges; wherein movement of the legs is limited by the triangular shaped rigid bodies.
15. The apparatus of any preceding or following embodiment:

wherein the plurality of panels comprises a plurality of first panels and a plurality of second panels; wherein the first panels configured with an offset that is out of phase from the second panels; and wherein the plurality of panels is configured such that the first and second panels are positioned in a sequentially alternating pattern.

16. The apparatus of any preceding or following embodiment, wherein the top layer comprises a foam pad with periodically positioned holes through the pad, the holes configured for air circulation through the top layer.
17. The apparatus of any preceding or following embodiment, wherein the top layer comprises a foam pad made from a material selected from the group of materials consisting of memory foam and foam rubber.
18. A multi-stable compliant-mechanism mattress apparatus, comprising: a top layer comprising a foam pad with periodically positioned holes through the pad, the holes configured for air circulation through the top layer; a grid of straps beneath the top layer the straps configured for air circulation through the top layer; a plurality of horizontal compliant panels beneath the grid of straps, the grid of straps providing support for the panels, the plurality of panels forming a compliant web; and a support substrate beneath the panels; wherein the compliant web is configured to move between first and second stable positions in response to application of horizontal force.

19. The apparatus of any preceding or following embodiment: wherein each panel in the plurality of panels comprises a single planar component; wherein the plurality of panels comprises a plurality of first panels and a plurality of second panels; wherein the first panels are configured with an offset that is out of phase from the second panels; and wherein the plurality of panels is configured such that the first and second panels are positioned in a sequentially alternating pattern.

20. The apparatus of any preceding or following embodiment:

wherein each panel in the plurality of panels comprises a series of trapezoid-shaped four-bar mechanisms; and wherein each bar in the four-bar mechanisms is joined to the panel by compliant joints that deform under load to produce an undulating pattern.

21. The apparatus of any preceding or following embodiment, further comprising a plurality of diamond-shaped flexures positioned adjacent the four-bar mechanisms and configured for smoothing the undulations.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A mattress apparatus for preventing bed sores, the apparatus comprising: (a) a foundation layer which supports the mattress apparatus; (b) a dynamic layer comprising a plurality of mechanism panels, in which each mechanism panel has a plurality of rigid legs extending from a base to a deformable strip formed by a series of adjacently connected top bars on either side, wherein the base of each said mechanism panel is connected to extend orthogonally from said foundation layer; (c) a flexible webbing layer coupled to the top bars of the deformable strip in each of said mechanism panels, said flexible webbing layer is configured to retain the mechanism panels extending from the foundation layer in a parallel relationship to one another; (d) a compliant layer, or layers, covering over said flexible webbing to provide a desired level of padding; (e) wherein each said mechanism panel comprises a plurality of rigid element bistable mechanisms in which the plurality of rigid legs are connected through flexible joints to both said base and to said deformable strip formed by the connected top bars, and wherein said flexible joints are configured to allow angular changes in one axis of movement; (f) wherein each of said plurality of rigid element bistable mechanisms comprises a unit cell having first and second rigid legs, of the plurality of rigid legs, whose proximal ends are attached to joints at said base, with said rigid legs extending up with distal ends attached at joints at said deformable strip connected top bars, the rigid legs spaced in a trapezoidal shape, whereby movement of the deformable strip in a first direction causes the first rigid leg to create a peak in said deformable strip and the second rigid leg to create a valley in said deformable strip, while movement of the deformable strip in a second direction causes the first rigid leg to create a valley in said deformable strip and the second rigid leg to create a peak in said deformable strip which creates undulations in the top surface of the mattress; (g) a stop retained on the base between said first and second rigid legs, which limits the extent to which the first and second rigid legs can flex at their respective joints and that said deformable strip can move in said first direction and said second direction; and(h) wherein said dynamic layer of said mattress apparatus upon being moved between said first positional state and said second positional state, in response to application of horizontal force, alternates the pattern of pressure being applied to a body of an occupant received thereon, wherein pressure peak points become pressure valleys, and pressure valleys become pressure peak points, to prevent bed sores which can arise when the pattern of pressure peak points remains static.

2. The apparatus of claim 1, wherein said compliant layer, or layers comprises a foam pad with periodically positioned holes through the pad, the holes configured for air circulation through the foam pad.

3. The apparatus of claim 1, wherein the compliant layer, or layers is made of a material selected from the group of materials consisting of memory foam and foam rubber.

4. The apparatus of claim 1, wherein the flexible webbing layer comprises a grid of orthogonal straps, at least one of said straps configured for coupling with a deformable strip of each panel.

5. The apparatus of claim 1:

wherein the plurality of mechanism panels comprises a plurality of first mechanism panels and a plurality of second mechanism panels;

wherein the first mechanism panels are configured with an offset that is out of phase from the second mechanism panels;

wherein the plurality of mechanism panels is configured such that the first and second mechanism panels are positioned in a sequentially alternating pattern; and wherein unit cells of adjacent mechanism panels, as attached to the base, are staggered so that the peaks and valleys created in the associated deformable strips and carried through the entire mattress apparatus by the flexible webbing layer and compliant layer, or layers, when switching between said first and second directions thereby creating a two-dimensional checkerboard pattern of peaks and valleys.

6. The apparatus of claim 5, wherein unit cells of adjacent mechanism panels are staggered by approximately one-half of the distance between adjacent unit cells in the lengthwise direction of each said mechanism panel.

7. The apparatus of claim 1, wherein said compliant layer includes a layer of diamond flexures which are attached to the deformable strip of said planar panels.

8. The apparatus of claim 1, wherein the base of said mechanism panels further comprises a bottom of said base which is configured for mounting to said foundation layer.

9. The apparatus of claim 1, wherein the foundation layer is flexible along the length of the mattress apparatus, yet is not flexible along the width of the mattress apparatus.

10. The apparatus of claim 1, wherein said foundation layer comprises a plurality of rigid horizontal segments.

11. The apparatus of claim 1, wherein said stop comprises a triangular shaped stop.

12. A mattress apparatus for preventing bed sores, the apparatus comprising: (a) a support substrate; (b) a plurality of mechanism panels, each having a jointed upper member, as a connected top bar, coupled to a base member with a plurality of rigid legs attached to the upper member and base members with flexible hinges, said base member mounted to said support substrate, said mechanism panels oriented parallel to each other; (c) wherein each of said mechanism panels comprises a series of unit cells, each cell comprising first and second rigid legs, of the plurality of rigid legs, attached at joints in a trapezoidal shape, whereby movement of the upper member in a first direction causes the first rigid leg to create a peak in said upper member and the second rigid leg to create a valley in said upper member, while movement of the upper member in a second direction causes the first rigid leg to create a valley in said upper member and the second rigid leg to create a peak in said upper member which creates undulations in the top surface of the mattress; (d)a stop retained on the base between said first and second rigid legs, which limits the extent to which the first and second rigid legs can flex from their respective joints to define the extent to which the rigid legs and upper member can move in both said first direction and said second direction; (e) wherein unit cells of adjacent mechanism panels, as attached to the base, are staggered so that the peaks and valleys created in the associated deformable strips create a two-dimensional checkerboard pattern of peaks and valleys; (f) a grid of straps joined to said upper member of said mechanism panels to maintain the mechanism panels extending from the support substrate are retained in a parallel relationship with one another; (q) at least one padding layer covering said grid of straps to provide a desired level of padding; and (h) wherein each upper member of said mechanism panels, in response to application of horizontal force, moves in relation to the base member between a first stable position to a second stable position which alternates the pattern of pressure being applied to a body of an occupant received on the mattress apparatus, wherein pressure peak points become pressure valleys, and pressure valleys become pressure peak points, to prevent bed sores which can arise when the pattern of pressure peak points remains static.

13. The apparatus of claim 12, wherein the support substrate is flexible along a lengthwise direction of the mattress apparatus.

14. The apparatus of claim 12, wherein said support substrate comprises a plurality of rigid horizontal segments flexibly couplcd joined to each other toward allowing free in-plane angular rotation.

15. The apparatus of claim 12, wherein the base of said mechanism panels further comprises a bottom of said base which is configured for mounting to said support substrate.

16. The apparatus of claim 12:

wherein the plurality of mechanism panels comprises a plurality of first mechanism panels and a plurality of second mechanism panels;

wherein the first mechanism panels are configured with an offset that is out of phase from the second mechanism panels; and wherein the plurality of mechanism panels are configured such that the first and second mechanism panels are positioned in a sequentially alternating pattern.

17. The apparatus of claim 12, wherein said at least one padding layer comprises a foam pad with periodically positioned holes through the pad, the holes configured for air circulation.

18. The apparatus of claim 12, wherein said at least one padding layer comprises a foam pad made from a material selected from the group of materials consisting of memory foam and foam rubber.

19. A multi-stable mechanism mattress apparatus for preventing bed sores, comprising:

(a) a top layer comprising a pad to provide a desired level of padding;

(b) a grid of straps beneath the top layer the straps configured for air circulation through the top layer;

(c) a plurality of horizontally compliant mechanism panels beneath the grid of straps, the grid of straps providing support for the mechanism panels, the plurality of mechanism panels attached to the grid of straps moving together, along with the top layer of the multi-stable mechanism mattress, between two stable states;

(d) a support substrate beneath the mechanism panels;

(e) wherein each said mechanism panel comprises a plurality of rigid element bistable mechanisms in which rigid legs are connected through flexible joints to both said base and to a deformable strip to which said grid of straps is attached;

(f) wherein each of said plurality of rigid element bistable mechanisms comprises a unit cell in which the rigid legs form a trapezoidal shape with said base and deformable strip, whereby movement of the deformable strip in a first direction causes the first rigid leg to create a peak in said deformable strip and the second rigid leg to create a valley in said deformable strip, while movement of the deformable strip in a second direction causes the first rigid leg to create a valley in said deformable strip and the second rigid leg to create a peak in said deformable strip which creates undulations in the top surface of the mattress; and (g) wherein the plurality of mechanism panels and the top layer of the multi-stable mechanism mattress is configured to move between first and second stable positions in response to application of horizontal force which alternates the pattern of pressure being applied to a body of an occupant received on said mattress.

20. The apparatus of claim 19:

wherein each mechanism panel in the plurality of mechanism panels comprises a single planar component;

wherein the plurality of mechanism panels comprises a plurality of first panels and a plurality of second panels;

wherein the first mechanism panels are configured with an offset that is out of phase from the second mechanism panels; and wherein the plurality of mechanism panels is configured such that the first and second mechanism panels are positioned in a sequentially alternating pattern, wherein peaks and valleys in said first mechanism panels, are aligned with valleys and peaks in said second mechanism panels, thus creating a checkerboard of peaks and valleys in said mattress apparatus.

21. The apparatus of claim 19:

wherein each mechanism panel in the plurality of mechanism panels comprises a series of trapezoid-shaped four-bar mechanisms; and wherein each bar in the four-bar mechanisms is joined to the panel by compliant joints that deforms under load to produce an undulating pattern.

22. The apparatus of claim 21, further comprising a plurality of diamond-shaped flexures positioned adjacent the four-bar mechanisms and configured for smoothing the undulations.

* * * * *